United States Patent
Mair et al.

(10) Patent No.: US 7,465,950 B2
(45) Date of Patent: Dec. 16, 2008

(54) APPARATUS FOR READING OUT X-RAY INFORMATION STORED IN STORAGE PHOSPHOR LAYER AND RADIOGRAPHY MODULE

(75) Inventors: Stephan Mair, Weilheim (DE); Stefan Stallmeister, Glonn (DE); Jens Nissen, Munich (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 128 days.

(21) Appl. No.: 11/567,002

(22) Filed: Dec. 5, 2006

(65) Prior Publication Data
US 2007/0153975 A1    Jul. 5, 2007

(30) Foreign Application Priority Data
Dec. 29, 2005  (EP)  .................. 05113054

(51) Int. Cl.
*B65H 5/00*  (2006.01)
(52) U.S. Cl. ..................... 250/589
(58) Field of Classification Search ......... 250/580, 250/581, 584, 585, 586, 587, 589, 590
See application file for complete search history.

(56) References Cited
U.S. PATENT DOCUMENTS

| | | | |
|---|---|---|---|
| 4,786,808 A | | 11/1988 | Saito |
| 5,151,597 A | * | 9/1992 | Agano .................. 250/587 |
| 2006/0091337 A1 | | 5/2006 | Mair |
| 2006/0180773 A1 | | 8/2006 | Frankenberger et al. |
| 2006/0180777 A1 | | 8/2006 | Frankenberger et al. |
| 2006/0180778 A1 | | 8/2006 | Fasbender et al. |
| 2007/0152179 A1 | * | 7/2007 | Mair et al. ............. 250/584 |

FOREIGN PATENT DOCUMENTS

| | | | |
|---|---|---|---|
| JP | 2003-344964 A | | 12/2003 |
| JP | 2003344964 A | * | 12/2003 |

OTHER PUBLICATIONS

English translation of Abstract for JP2003-344964, published Dec. 3, 2003.
European Search Report from European Application No. 05113054.0, filed on Dec. 29, 2005.

* cited by examiner

*Primary Examiner*—David P Porta
*Assistant Examiner*—David S Baker
(74) *Attorney, Agent, or Firm*—Houston Eliseeva, LLP

(57) ABSTRACT

An apparatus (1) for reading out X-ray information of an X-ray image stored in a storage phosphor layer (4) includes an irradiation device (13) for irradiating the storage phosphor layer (4) with stimulation radiation (14) and a detection device (16) for collecting emission radiation (15) which the storage phosphor layer (4) emits as a result of the irradiation by means of the stimulation radiation (14). The irradiation device (13) and the detection device (16) are fixedly or rigidly associated with one another. Furthermore, an actuation device (8) is provided for producing a relative movement between the storage phosphor layer (4) on the one hand and the irradiation device (13) and the detection device (16) on the other hand. According to the invention, the apparatus (1) includes acquiring unit (19, 19', 20, 20', 21, 21') for acquiring a speed of the relative movement. In this way, in a technically simple way, good image quality of an X-ray image read out can be guaranteed. Furthermore, the invention relates to a radiography module with this type of apparatus (1).

22 Claims, 2 Drawing Sheets

APPARATUS FOR READING OUT X-RAY INFORMATION STORED IN STORAGE PHOSPHOR LAYER AND RADIOGRAPHY MODULE

RELATED APPLICATIONS

This application claims priority to European Application No. EP05113054.0, filed on Dec. 29, 2005, which is incorporated herein by reference in its entirety.

BACKGROUND OF THE INVENTION

Apparatuses for reading out X-ray information stored in a storage phosphor layer are used in particular in the field of computer radiography (CR) for medical purposes. An image of an object, for example a patient or a body part of the patient, is produced here by means of X-ray radiation, and this is stored in a storage phosphor layer as a latent image. This type of X-ray image therefore contains X-ray information about the object. In order to read out the X-ray information stored in the storage phosphor layer, the storage phosphor layer is stimulated by means of an irradiation device. As a result of this stimulation the storage phosphor layer emits light which has an intensity corresponding to the X-ray information stored in the storage phosphor layer. The light emitted from the storage phosphor layer is collected by a detection device and is converted into electric signals which contain an image of the X-ray information. The electric signals are further processed, and the X-ray information stored in the storage phosphor layer is then made visible. The X-ray information can be shown directly on a monitor, for example, or by means of a printer used specially for X-ray images on a photographic X-ray film.

A read-out apparatus for reading out X-ray information is already known which is in the form of an independent module which can be inserted or integrated into different X-ray systems, such as e.g. an X-ray stand or X-ray table, for taking X-ray images. In order to read out the X-ray information, the read-out apparatus can remain in the X-ray system. Depending upon the different embodiments of the X-ray systems used, the read-out apparatus can be inserted into the X-ray systems in different alignments or orientations. For this, the read-out apparatus is pivotable. For example, the read-out apparatus can be pivotable in an angle range of between 0° and 90° in relation to the horizontal. In this way, it can be used very flexibly in a plurality of different X-ray systems. But also when reading out the X-ray information outside of an X-ray system, because of the possibility of pivoting, one is not restricted to a single read-out position; one can in fact select this as appropriate depending upon the given circumstances. However, it has been established that the quality of the X-ray images read out differs depending upon the pivoting and in particular distortion can occur in the X-ray image read out.

SUMMARY OF THE INVENTION

It is therefore the object of this invention to provide an apparatus for reading out X-ray information stored in a storage phosphor layer or a radiography module with which, in a technically simple way, good image quality of the X-ray image read out can be guaranteed.

The apparatus according to the invention for reading out X-ray information stored in a storage phosphor layer includes an irradiation device for irradiating the storage phosphor layer with stimulation radiation and a detection device for collecting emission radiation which the storage phosphor layer emits as a result of the irradiation by means of the stimulation radiation. The irradiation device and the detection device are fixedly associated with one another. The irradiation and the detection device can preferably be disposed such that they are directly adjacent to the storage phosphor layer. In this way, the stimulation radiation can be directed particularly accurately at the storage phosphor layer to be stimulated, and the emission radiation emitted by the storage phosphor layer as a result of the stimulation is collected particularly accurately. Moreover, the apparatus includes an actuation device for producing a relative movement between the storage phosphor layer on the one hand and the irradiation device and the detection device on the other hand. According to the invention, the apparatus has an acquiring unit for acquiring a speed of the relative movement. In this way, the current speed of the relative movement can be determined. If this deviates, for example, from a desired speed, the apparatus can advantageously take the deviation into account when reading out and/or processing the X-ray information read out. This is especially advantageous if the apparatus is designed to be pivotable. An apparatus according to the invention for reading out X-ray information is integrated into the radiography module according to the invention.

The invention is based upon the knowledge that in particular a pivotable read-out device is subjected to different loading due to the force of gravity depending upon its alignment, i.e. its orientation or position. Because when reading out the X-ray information, very stringent requirements are made of the read-out apparatus with regard to synchronisation and stringent requirements are made of the components of the read-out apparatus as regards the accuracy of their modes of operation and function, the force of gravity, which has varying degrees of effect upon the read-out apparatus and its components with different orientations of the read-out apparatus, is of great significance. According to the invention it is possible, for example, to avoid artifacts in the X-ray image read out which occur depending upon the orientation of the apparatus. These artifacts can occur, e.g. as a result of bending of individual components of the read-out apparatus due to their own weight. Furthermore, it is possible for distortions or artifacts to occur as a result of a change to a read-out speed with which the storage phosphor layer is read out. Depending upon the orientation of the read-out apparatus e.g. slippage can occur during read-out which can in particular be larger or smaller. This leads to changes in the read-out speed. As a result of this invention, the apparatus is advantageously given the possibility of using the acquisition of the speed in order to avoid distortion and other damaging influences upon the quality of the X-ray image read out.

In one advantageous embodiment of the invention, the acquiring unit is designed such that it acquires the speed a number of times when reading out the stored X-ray information. In this way, speeds which change a number of times during read-out, e.g. when slippage occurring during read-out changes during read-out, can be established and appropriately corrected. In this way, even further improved quality can be achieved when reading out X-ray images.

It is particularly preferred if the acquiring unit is designed such that it acquires at least an average speed of the relative movement. This average speed is acquired between at least two relative positions which the storage phosphor layer takes relative to the irradiation device and the detection device. This type of determination of the average speed is particularly easy to convert.

Preferably, the average speed is acquired during the read-out of the X-ray information. In this way, a particularly high image quality is guaranteed.

Preferably, the acquiring unit has at least two sensors which are allocated to the at least two relative positions. The at least two sensors serve to determine a time which the relative movement requires when reading out the X-ray information between reaching the at least two positions. In particular, the sensors can be photo sensors. This is particularly cost-effective and simple to implement. Furthermore, photo sensors advantageously function without any inactivity.

In a particularly preferred embodiment of the invention, a controller is provided for processing the X-ray information read out from the storage phosphor layer which is designed such that it processes the X-ray information read out depending upon the acquiring of the speed of the relative movement. In this way, a good quality of the X-ray image can be achieved particularly efficiently in that the undesired distortion occurring during read-out is corrected by means of the controller when processing the X-ray information.

Preferably, the controller contains pre-specified details for processing the X-ray information read out. This is designed such that it selects at least some of the pre-specified details depending upon the acquiring of the speed of the relative movement and use the details selected for processing the X-ray information. The details for processing the X-ray information read out can advantageously be contained in a table—a so-called look-up table—which can be incorporated into the controller particularly easily. The details for processing the X-ray information read out can already be established for different orientations of the apparatus e.g. by means of tests before reading out the X-ray information.

Preferably, the controller is designed such that it establishes a pixel size of the X-ray information read out depending upon the acquiring of the speed of the relative movement, as observed in the direction of the relative movement. In addition or alternatively, the controller is advantageously designed such that it establishes an intensity of the X-ray information read out depending upon the acquiring of the speed of the relative movement. By means of these embodiments, relevant improvements of the quality of the X-ray image can be guaranteed particularly efficiently.

In a particularly preferred further development of the invention, a further controller is provided for controlling the apparatus. The further controller is designed such that it controls the read-out of the X-ray information depending upon the acquiring of the speed of the relative movement. In this case, the read-out itself is implemented in an appropriate way such that undesired distortion is avoided early on, when collecting the X-ray information. The further controller can control one or more components of the apparatus as appropriate depending upon the orientation acquired.

It is particularly preferred if the further controller are designed such that it controls the irradiation device depending upon the acquiring of the speed of the relative movement. Advantageously, different read-out depths in the storage phosphor layer can be avoided here. These occur with different read-out speeds as a result of changes to the stimulation radiation applied to the storage phosphor layer. With a slow read-out speed, the quantity of the stimulation radiation applied to the storage phosphor layer is greater and the quantity of emission radiation emitted is greater than with a fast read-out speed. In this respect, with a slow read-out speed, the intensity of the X-ray information read out is greater than with a fast read-out speed.

Advantageously, the further controller is designed such that it controls the detection device depending upon the acquiring of the speed of the relative movement. With a slow read-out speed, the quantity of emission radiation emitted is greater than with a fast read-out speed. This can easily be equalised in that the time over which the detection device absorbs emitted emission radiation is set depending upon the orientation of the apparatus.

Preferably, the further controller is designed such that it controls the speed of the relative movement depending upon the acquiring of the speed of the relative movement. The speed itself can therefore be controlled in a technically simple manner. One of the basic causes for the occurrence of distortion can in this way be eliminated from the outset.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
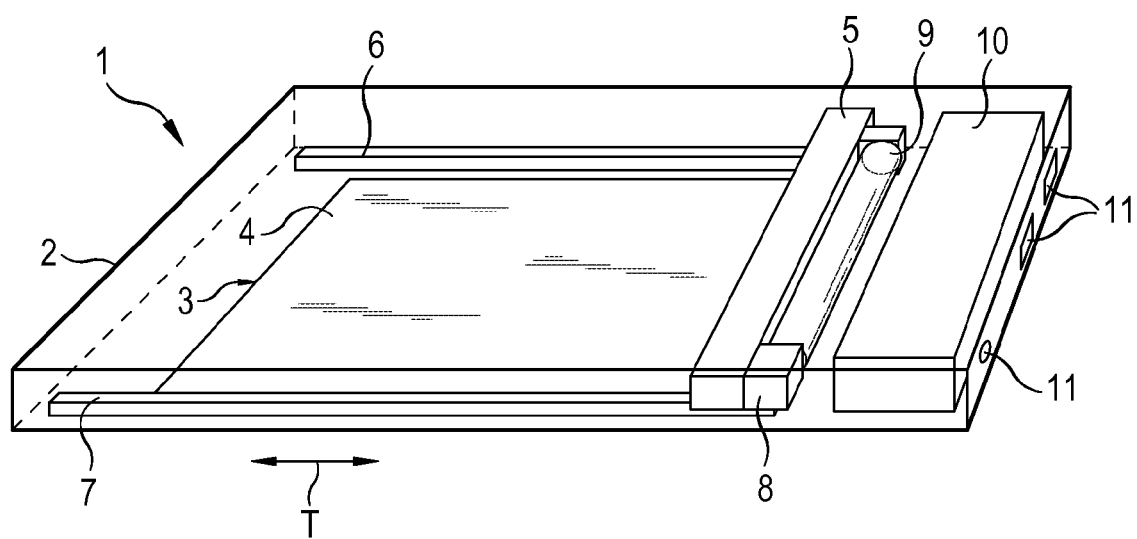
FIG. 1 is a schematic, perspective illustration of an example of an embodiment of an apparatus according to the invention for reading out X-ray information stored in a storage phosphor layer, the apparatus being in the form of a radiography module.

FIG. 1 shows a schematic, perspective illustration of an embodiment of a read-out apparatus according to the invention for reading out X-ray information stored in a storage phosphor layer. The read-out apparatus here is in the form of a radiography module 1. The radiography module 1 can be inserted or integrated into different X-ray systems, such as e.g. an X-ray stand or an X-ray table for taking X-ray images. For this, the radiography module 1 is pivotable. In order to read out the X-ray image stored in the storage phosphor layer the radiography module 1 can remain in the X-ray system and does not have to be—as with a conventional X-ray cassette—removed from the X-ray system and conveyed to a separate read-out station.

Figure 2:
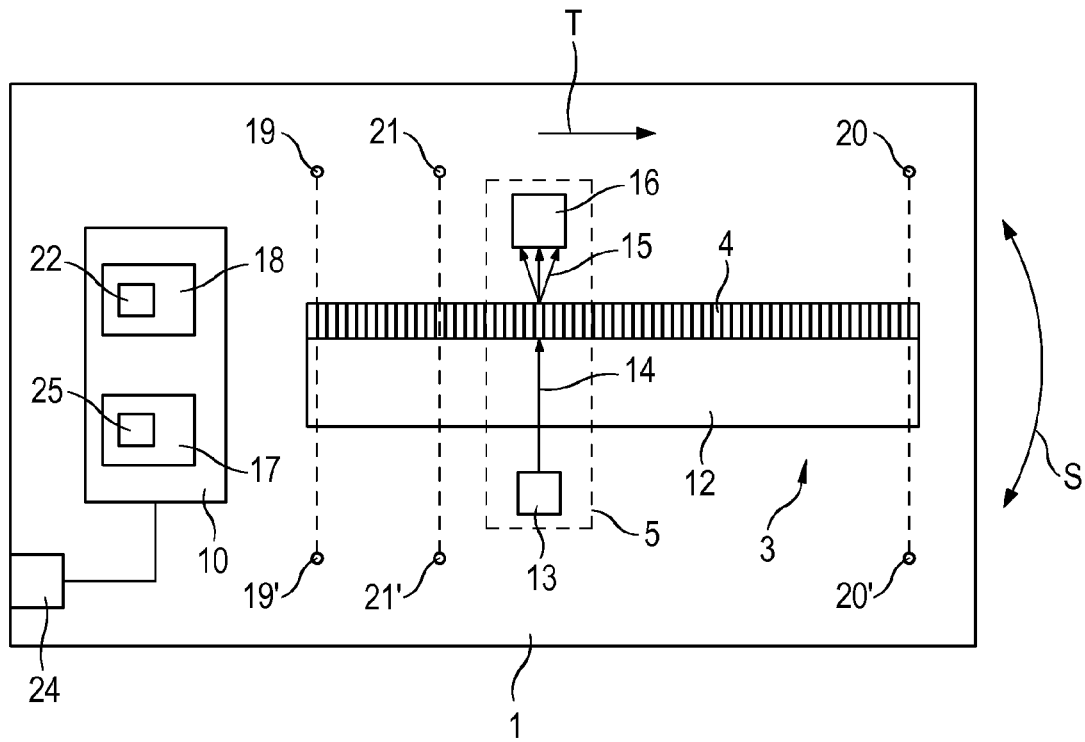
FIG. 2 is a further schematic illustration of a structure of the radiography module according to FIG. 1.

The radiography module 1 comprises a housing 2 in which a storage phosphor plate 3 is disposed. The storage phosphor plate 3 has a storage phosphor layer 4 and a support layer to which the storage phosphor layer 4 is applied (FIG. 2). Here, the storage phosphor layer 4 is the top layer of the storage phosphor plate 3. The storage phosphor plate 3 is disposed securely in the housing 2 of the radiography module 1, i.e. the storage phosphor plate 3 is connected securely to the housing 2 by means of suitable connection elements. The connection to the housing 2 can be rigid or swinging, e.g. by means of appropriate suspension elements so as to attenuate any external impacts to the housing 2 and transfer of the latter to the storage phosphor plate 3.

Furthermore, the radiography module 1 includes a reading head 5 for reading out the X-ray information from the storage phosphor layer 4. The reading head 5 is mounted movably in the housing 2. For this, disposed in the region of the two long sides of the storage phosphor plate 3 are guides 6 and 7 which provide the reading head 5 with bearings, preferably in the form of air bearings, and guidance. In order to read out the X-ray information, the scanning head 5 is actuated by an appropriate actuator 8, e.g. a linear motor or a step motor with a friction wheel gear and cable drive, and moved over the storage phosphor plate 3 in conveyance direction T. A relative movement for read-out therefore takes place between the storage phosphor layer 4 and the reading head 5. Actuation of the reading head 5, and so the relative movement between the storage phosphor layer 4 and the reading head 5, takes place continuously with a very precise linear and constant speed. In this example of an embodiment the reading head 5 can be moved over the storage phosphor layer 4, whereas the storage phosphor layer 4 is securely disposed in the housing 2. However, it is also possible to dispose the reading head 5 securely in the housing and to move the storage phosphor plate 3 past the reading head 5.

In addition to the reading head 5, a deletion lamp 9 is provided which can also be actuated by the actuator 8 and moved over the storage phosphor layer 4. The deletion lamp 9 serves to delete any remaining information in the storage phosphor layer 4 which may still be present after read-out before a subsequent X-ray is taken.

Furthermore, a control device 10 is provided which controls the read-out and deletion process as well as any signal processing processes. Various interfaces 11 are provided on the control device 10 which are required for transferring energy, possibly air, control signals and/or image signals, to and from the radiography module 1.

FIG. 2 shows a further schematic illustration of a structure of the radiography module 1 according to FIG. 1. The radiography module 1 is shown in a side view here. The storage phosphor plate 3 is shown which has a support layer 12 and the storage phosphor layer 4. The storage phosphor layer 4 is preferably made up of a plurality of phosphor particles which serve to store the X-ray information. The support layer 12 can be a laminate which is made up of various layers and materials. The support layer 12 is a transparent support layer here which is partially permeable to radiation.

The reading head 5 includes an irradiation device 13 which serves to irradiate the storage phosphor layer 4 with stimulation radiation 14. A laser diode line is used here as the irradiation device 13, and this contains a plurality of laser diodes disposed next to one another. With this laser diode line a line of the storage phosphor layer 4 is at the same time irradiated and stimulated. However, it is also possible to use an irradiation device 13 of a different form.

As a result of the stimulation of the storage phosphor layer 4 by means of the stimulation radiation 14, the storage phosphor layer 4 emits emission radiation 15 the intensity of which is dependent upon the X-ray information stored in the storage phosphor layer 4. In order to collect the emission radiation emitted the reading head 5 includes a detection device 16. Here, the detection device 16 has a line detector which can include a so-called "charge-coupled device" (CCD) line. The CCD line has a plurality of photodetectors disposed parallel and in a line next to one another. By means of the detection device 16 a photoelectric conversion of the emission radiation 15 received can be implemented. The detection device 16 is read out at pre-specified intervals of time. Alternatively, the detection device 16 can have, instead of the CCD line, a light conductor, for example, to which a photomultiplier is attached. There is a secure connection between the irradiation device 13 and the detection device 16 so that the image of the X-ray information stored in the storage phosphor layer 4, i.e. the stimulation of the storage phosphor layer 4 and the receipt of the radiation 15 emitted as a result of stimulation, are matched precisely to one another, and accurate allocation is always guaranteed, even during the actual read-out process.

In this example of an embodiment, the irradiation device 13 is disposed beneath and the detection device 16 above the storage phosphor plate 3. The irradiation device 13 is directly adjacent to the support layer 12 and the detection device 16 to the storage phosphor layer 4. The stimulation radiation 14 can thus penetrate into the transparent support layer 12 and pass from underneath into the storage phosphor layer 4.

The control device 10 includes first controller 17 for controlling the radiography module 1 and its components. The first controller 17 therefore controls in particular the functions of the irradiation device 13 and the detection device 16 and of the actuator 8. The first controller 17 is connected to these components of the radiography module 1. Furthermore, the control device 10 has second controller 18 for processing the X-ray information read out from the storage phosphor layer 12. The second controller 18 is connected in particular to the detection device 16 in order to process the electric signals produced by the latter which contain an image of the X-ray information stored in the storage phosphor layer 4. The two controllers 17 and 18 can also be realized by means of a single controller.

In order to read out the X-ray information, the reading head 5, i.e. both the irradiation device 13 and the detection device 16, are moved by means of the actuator 8 with a conveyance speed along the storage phosphor plate 3 in conveyance direction T. The size of the pixels in the X-ray image read out, and so the resolution of the latter, as observed in conveyance direction T, is dependent, among other things, upon this conveyance speed and the pre-specified interval of time for the read-out of the detection device 16. The radiography module 1 according to the invention includes three sensors with which the conveyance speed can be reviewed. A first sensor 19, 19' is, as observed in conveyance direction T, disposed at the start of the storage phosphor plate 3, a second sensor 20, 20" at its end, and a third sensor 21, 21' in the first third of the storage phosphor plate 3. Alternatively, one or more of these sensors 19, 19' and 20, 20' and 21, 21' can also be disposed in front of the storage phosphor plate 3. It is possible to provide further or also fewer sensors. The sensors 19, 19', 20, 20', 21, 21' here are photo sensors which detect the reading head 5 passing through them. It is also possible, however, to use other types of sensor. By means of the two sensors 19, 19' and 20, 20' a time at the start and a time at the end of the read-out process can be established. The sensor 21, 21' establishes a time still relatively at the start of the read-out process, however after a sufficient distance has been covered, so as to guarantee that a measurement result for a relevant distance is determined. By means of the sensors 19, 19', 20, 20', 21, 21' the time is measured which the reading head 5 requires in order to cover the distance between the sensors 19, 19', 20, 20', 21, 21'. This gives an average conveyance speed for the reading head 5 because the distances are known.

The sensors 19, 19', 20, 20', 21, 21' are connected to both controllers 17, 18 in order to relay the reading head 5 passing through them for use by the controllers 17, 18. The controllers 17, 18 can establish a deviation of the average conveyance speed measured from a pre-specified conveyance speed. Thereupon, they can trigger the appropriate counter-measures.

The first controller 17 for controlling the radiography module 1 can advantageously undertake correspondingly appropriate control of components of the radiography module 1 directly after the third sensor 21, 21' has been passed through by the reading head 5 with a speed to be corrected. Because the third sensor 21, 21' is already disposed here in the first third of the distance to be covered in order to read out the X-ray information, the first controller 17 can, if appropriate, already undertake appropriate control of the components during the further read-out of the current X-ray image. The actuator 8 can be triggered to drive the reading head 5 faster or slower depending upon the correction to be made. In addition, or alternatively, the first controller 17 can be designed such that they control the irradiation device 13 such that it appropriately changes the radiation intensity of the stimulation radiation 14 or the duration of the irradiation of the stimulation radiation into a line of the storage phosphor layer. If the conveyance speed is too high, the radiation intensity of the stimulation radiation can advantageously be increased, and if the conveyance speed is too slow, it can be reduced so as to obtain the most constant possible radiation quantities of stimulation radiation when stimulating the lines of the storage phosphor layer 4. Furthermore, in addition or alternatively, the first controller 17 can be designed such that it controls the detection device 16 such that the time taken to collect emission radiation for each line of the storage phosphor layer 4 is changed. With excessively high conveyance speed the time can advantageously be shortened, and with excessively slow conveyance speed it can be increased so as to obtain the most constant pixel size, and so resolution, in the X-ray image possible, observed in conveyance direction T. The distances which are covered by the reading head 5 for the read-out of the individual lines of the storage phosphor layer 4 are then constant.

The second controller 18 for processing the X-ray information read out is advantageously designed such that it processes the X-ray information read out depending upon the conveyance speed acquired. The conveyance speed acquired can be made up of several partial conveyance speeds. For this, the average partial speed determined when covering the distance between sensors 19, 19' and 20, 20', the distance between sensors 19, 19' and 21, 21' and/or the distance between sensors 21, 21' and 20, 20', are available. The partial speeds can be used by the second controller individually or in an appropriate combination. The second controller 18 here contains pre-specified details for processing the X-ray information read out. These details include guidelines as to how the X-ray information read out is to be corrected. The details are stored in a storage unit 22 of the second controller 18, especially as so-called look-up tables. They were advantageously determined by preliminary tests and give typical correction possibilities which correspond in particular to experienced values. The second controller 18 is designed such that it selects at least some of the pre-specified details depending upon the conveyance speed acquired and use the details selected in order to process the X-ray information. The second controller 18 establishes, as viewed in the direction of the relative movement, the pixel size of the X-ray information read out and/or an intensity of the X-ray information read out depending upon the conveyance speed acquired. It can therefore be guaranteed that the intensities of X-ray images read out and processed are the same and that their resolutions, in particular as observed in conveyance direction T, are constant.

As already described above, the radiography module 1 is pivotable. This is indicated in FIG. 2 by an arcuate double arrow S. In order to pivot, the radiography module 1 can have an axis of rotation around which it can pivot. The radiography module 1 can be used in different alignments i.e. orientations or positions. The orientation of the radiography module 1 is given, for example, by the design of an image taking device for the radiography module 1 in an X-ray system, e.g. an X-ray table, in which the radiography module 1 is inserted. This image taking device can be inclined in relation to a horizontal.

Figure 3:
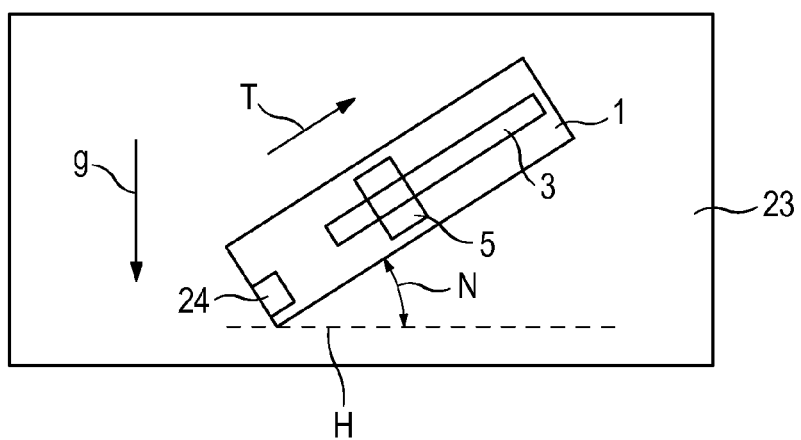
FIG. 3 is a schematic illustration of an example of an application of the radiography module according to FIG. 1 fitted in an X-ray system.

FIG. 3 shows an example of an X-ray system 23 into which the radiography module 1 has been inserted. The radiography module 1 has an inclination N in relation to a horizontal H in the X-ray system 23. Due to the inclination N of the radiography module 1, the storage phosphor plate 3 and the reading head 5 also have this type of inclination N. This means that when the reading head 5 is actuated by the inclined, pivoted orientation of the radiography module 1, a force of gravity g acts upon the actuation, i.e. the movement in conveyance direction T, of the reading head 5. The force of gravity g results from the acceleration due to gravity. Because during movement a very high degree of synchronisation is required by the reading head 5, this effect of the force of gravity g can be disadvantageous for the read-out of the stored X-ray information and cause distortion in the X-ray image read out. When actuating the reading head 5 by means of the actuator 8, under certain circumstances slippage can occur such that artifacts are produced. Depending upon the degree of inclination N, the effect of the force of gravity g can vary in strength. This occurrence of slippage can be established by means of the sensors 19, 19', 20, 20', 21, 21', and its negative effects upon the X-ray image read out can then be prevented or corrected by means of the first controller 17 and/or the second controller 18.

The radiography module 1 here additionally includes acquiring unit 24 for acquiring its orientation. Of particular interest here is its orientation in relation to the horizontal. The acquiring unit can for example be an acceleration sensor which acquires the direction of the acceleration due to gravity. In this way it can be determined in which direction the load is applied to the reading head 5 by the force of gravity. The acquiring unit 2 is connected to the control device 10, and in particular to the two controllers 17, 18 (FIG. 2). The orientation established can therefore be relayed to the controller 17, 18 for further processing.

The first controller 17 is designed here such that it controls the read-out of the X-ray information depending, furthermore, upon the orientation of the X-ray module 1 acquired. For this, the first controller 17 controls one or more of the components of the radiography module 1, in particular the irradiation device 13, the detection device 16 and/or the actuator 8 as appropriate. This control is implemented in the appropriate manner, as described above in connection with the change to the conveyance speed. Even stimulation of the lines of the storage phosphor layer 4, appropriate collecting of the emission radiation 15 and/or a constant conveyance speed should thus advantageously be guaranteed. The first controller 17 includes pre-specified details for controlling the apparatus. These details include guidelines as to how the respective components of the radiography module 1 are to be appropriately corrected. The details are stored in a storage unit 25 of the first controller 17 as so-called look-up tables. They were advantageously determined by preliminary tests, and give typical correction possibilities which correspond in particular to experienced values. The details correspond to calibration characteristic lines or calibration images. The first controller 17 is designed such that it selects some of the pre-specified details depending upon the orientation of the radiography module 1 acquired and use the details selected in order to control it.

The second controller 18 is designed here such that it processes the X-ray information read out depending upon the acquiring of the orientation of the X-ray module 1. Further pre-specified details for processing the X-ray information read out are contained in the storage unit 22 here. The pre-specified details were also established by preliminary tests and give possibilities for how the X-ray information read out can be corrected depending upon the orientation, i.e. in particular the level of inclination N. The further details are also stored in the form of so-called look-up tables. The second controller 18 is designed such that it selects at least some of the pre-specified details depending upon the orientation of the radiography module 1 acquired and use the selected details for processing the X-ray information. As described above in connection with the change in conveyance speed, the intensity and/or the resolution of the X-ray images should be adjusted here as appropriate.

In this example of an embodiment, the radiography module 1 is self-learning. The radiography module 1 is designed such that it allocates the orientation acquired by the acquiring unit 24 and the conveyance speed of the reading head 5 acquired by the sensors 19, 19', 20, 20', 21, 21' when this acquired orientation is available, to one another. This allocation is then added to the pre-specified details stored in the storage unit 22 for processing the X-ray information and to the pre-specified details stored in the storage unit 25 for controlling the radiography module 1. In this way, these details can continue to be refined and improved. With increasing use of the radiography module 1, its correction from distortion occurring as a result of pivoting away from the horizontal is constantly improved. This can be used for subsequent X-ray images.

List of reference numbers is: 1 radiography module; 2 housing; 3 storage phosphor plate; 4 storage phosphor layer; 5 reading head; 6 guide; 7 guide; 8 actuator; 9 deletion lamp; 10 control device; 11 interfaces; 12 support layer; 13 irradiation device; 14 stimulation radiation; 15 emission radiation; 16 detection device; 17 first controller; 18 second controller; 19, 19' sensor; 20, 20' sensor; 21, 21' sensor; 22 storage unit; 23 X-ray system; 24 acquiring unit; 25 storage unit; T conveyance direction; H horizontal; N inclination; g force of gravity; and S pivot direction.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for reading out X-ray information of an X-ray image stored in a storage phosphor layer, comprising:
   an irradiation device for irradiating the storage phosphor layer with stimulation radiation;
   a detection device for collecting emission radiation which the storage phosphor layer emits as a result of the irradiation by means of the stimulation radiation, the irradiation device and the detection device being rigidly associated with one another;
   an actuation device for producing a relative movement between the storage phosphor layer on the one hand and the irradiation device and the detection device on the other hand; and
   an acquiring unit for acquiring an average speed of the relative movement, the average speed being acquired between at least two relative positions which the storage phosphor layer takes relative to the irradiation device and the detection device.

2. The apparatus according to claim 1, wherein the acquiring unit acquires a speed a number of times when reading out the stored X-ray information.

3. The apparatus according to claim 1, wherein the average speed is acquired during the read-out of the X-ray information.

4. The apparatus according to claim 1, wherein the acquiring unit includes at least two sensors which are allocated to the at least two relative positions to determine a time which the relative movement requires when reading out the X-ray information between reaching the at least two positions.

5. The apparatus according to claim 4, wherein in that the at least two sensors include photo sensors.

6. The apparatus according to claim 1, wherein a controller processes the X-ray information read out from the storage phosphor layer in response to a speed of the relative movement.

7. The apparatus according to claim 6, wherein the controller contains pre-specified details for processing the X-ray information read out, selects at least some of the pre-specified details depending upon the acquiring of the average speed of the relative movement, and uses the details selected for processing the X-ray information.

8. The apparatus according to claim 6, wherein the controller establishes a pixel size of the X-ray information read out depending upon the acquiring of the average speed of the relative movement.

9. The apparatus according to claim 6, wherein the controller establishes an intensity of the X-ray information read out depending upon the acquiring of the average speed of the relative movement.

10. The apparatus according to claim 1, further comprising a controller that controls the read-out of the X-ray information depending upon the acquiring of the average speed of the relative movement.

11. The apparatus according to claim 10, wherein the controller controls the irradiation device depending upon the acquiring of the average speed of the relative movement.

12. The apparatus according to claim 10, wherein the controller controls the detection device depending upon the acquiring of the average speed of the relative movement.

13. The apparatus according to claim 12, wherein the controller controls the speed of the relative movement depending upon the acquiring of the average speed of the relative movement.

14. An X-ray cassette system, comprising a housing; and
   an apparatus for reading out X-ray information of an X-ray image stored in a storage phosphor layer in the housing, the apparatus including:
      an irradiation device for irradiating the storage phosphor layer with stimulation radiation;
      a detection device for collecting emission radiation which the storage phosphor layer emits as a result of the irradiation by means of the stimulation radiation, the irradiation device and the detection device being rigidly associated with one another;
      an actuation device for producing a relative movement between the storage phosphor layer on the one hand and the irradiation device and the detection device on the other hand; and
      an acquiring unit for acquiring an average speed of the relative movement, the average speed being acquired between at least two relative positions which the storage phosphor layer takes relative to the irradiation device and the detection device.

15. A method for reading out X-ray information of an X-ray image stored in a storage phosphor layer, comprising:

irradiating the storage phosphor layer with stimulation radiation;

collecting emission radiation which the storage phosphor layer emits as a result of the irradiation by means of the stimulation radiation, the irradiation device and the detection device being rigidly associated with one another;

producing a relative movement between the storage phosphor layer on the one hand and the irradiation device and the detection device on the other hand; and determining an average speed of the relative movement.

16. The method according claim 15, further comprising processing the X-ray information read out from the storage phosphor layer in response to a speed of the relative movement.

17. The method according to claim 15, further comprising establishing a pixel size of the X-ray information read out depending upon a speed of the relative movement.

18. The method according to claim 15, further comprising establishing an intensity of the X-ray information read out depending upon a speed of the relative movement.

19. The method according to claim 15, further comprising controlling the read-out of the X-ray information depending upon a speed of the relative movement.

20. The method according to claim 15, further comprising controlling the irradiation device depending upon a speed of the relative movement.

21. The method according to claim 15, further comprising controlling the detection device depending upon a speed of the relative movement.

22. The method according to claim 15, further comprising controlling the speed of the relative movement depending upon the average speed of the relative movement.

* * * * *